United States Patent Office 2,735,117
Patented Feb. 21, 1956

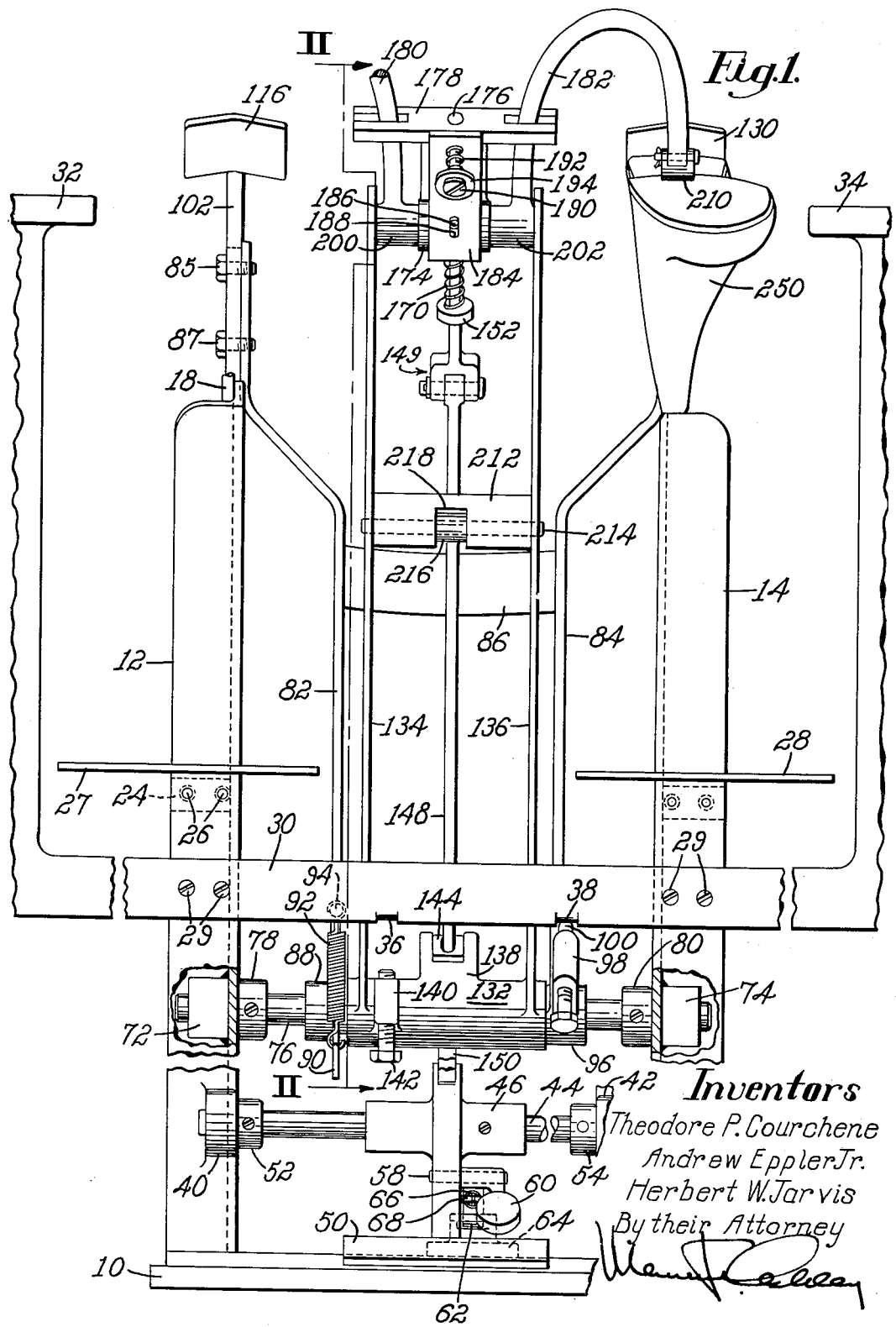

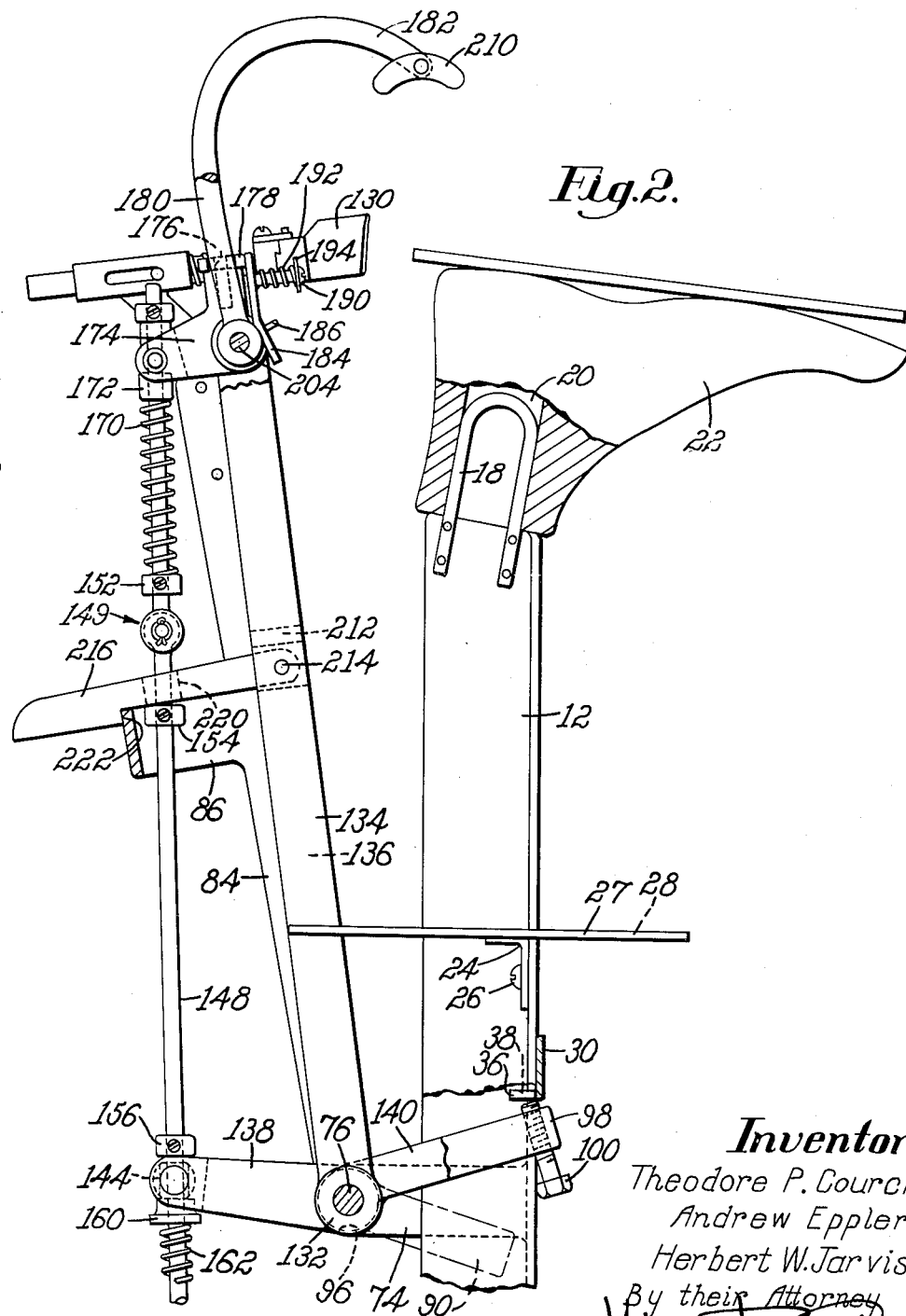

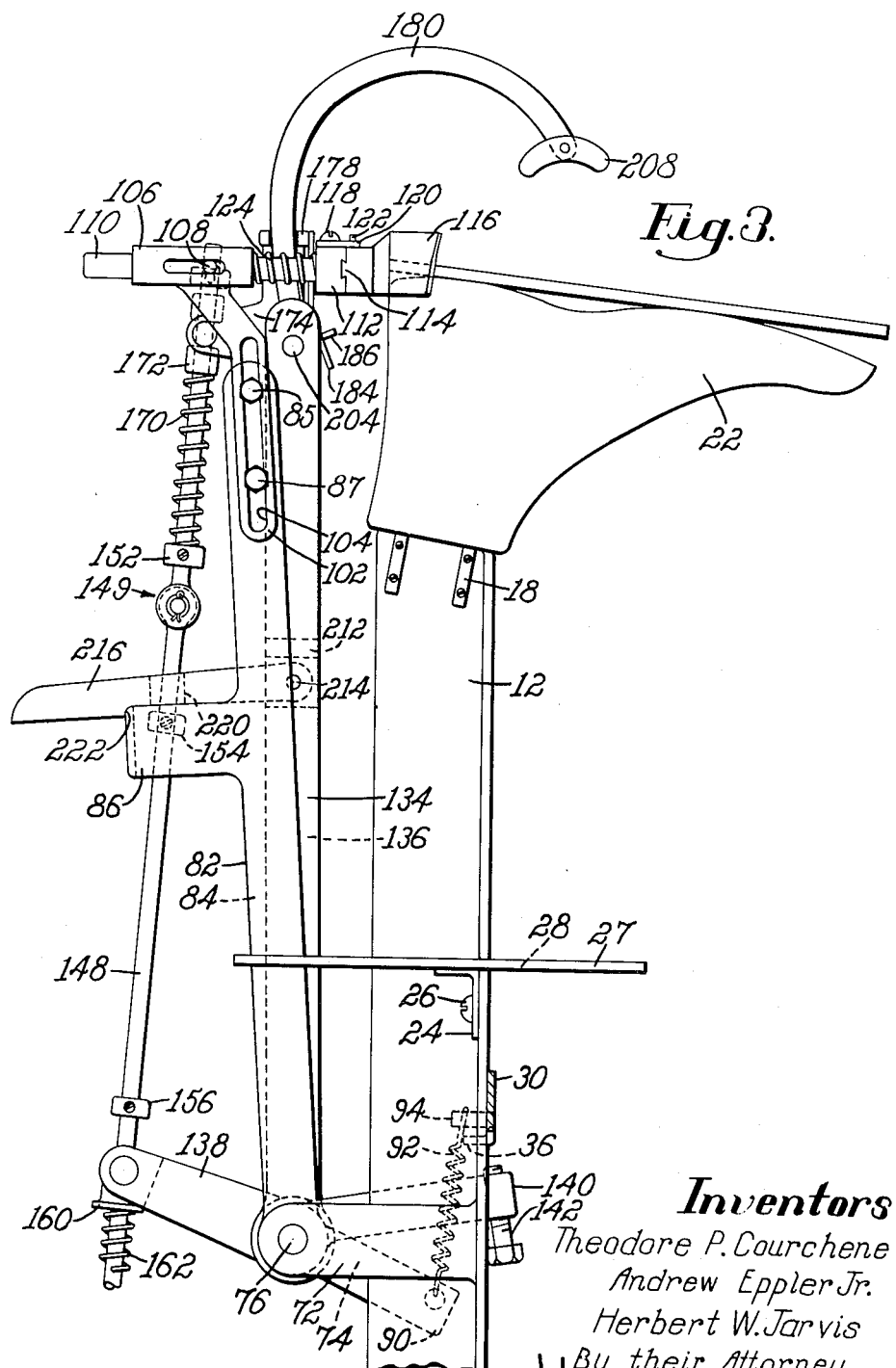

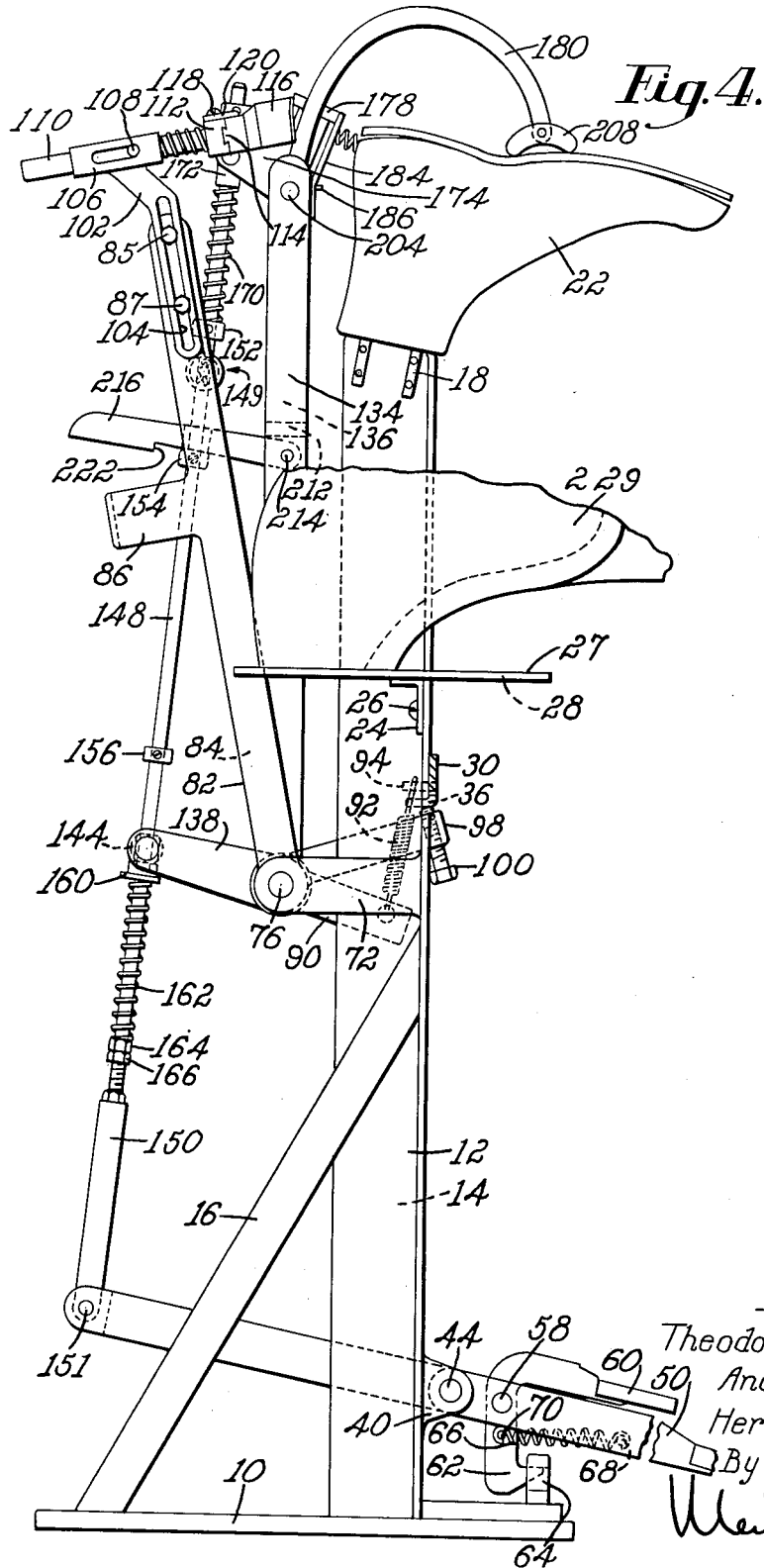

2,735,117

APPARATUS TO FACILITATE JOINDER OF UPPERS AND INSOLES

Theodore P. Courchene, Beverly, Andrew Eppler, Jr., Lynn, and Herbert W. Jarvis, Hingham, Mass., assignors to United Shoe Machinery Corporation, Flemington, N. J., a corporation of New Jersey Application November 5, 1952, Serial No. 318,942

9 Claims. (Cl. 12—1)

This invention relates to apparatus for use in the manufacture of shoes, and more particularly to apparatus by means of which an operator may expeditiously and accurately join an upper and an insole preparatory to a subsequent lasting operation.

In some types of footwear, such as tennis shoes or other types of rubber soled shoes, the uppers are secured to the insoles by an adhesive. The inside marginal surface of each upper is usually coated with some form of an adhesive such as rubber cement and then the upper is manually placed into reasonably accurate position with relation to the insole and held there by means of the adhesive. The proper locating of the shoe parts with relation to each other has heretofore consumed considerable time and effort on the part of an operator and the considerable human element involved in the operation made it difficult, if not impossible, to secure any high degree of uniformity in results.

It is an object of the present invention to provide an apparatus in the use of which an operator may readily and accurately position an insole and upper in properly assembled relation and temporarily secure them together in that relation as intermediate steps in the manufacture of shoes.

To this end and in accordance with important characteristics of the invention, at least one jack or preferably a pair of jacks is provided upon which a number of uppers may be stacked in readiness for assembly with insoles consecutively to be received on corresponding lasts to be placed in inverted position on the jack or jacks. A gage is mounted for movement into and away from operative relation with the heel ends of a last and insole placed on each jack and a means for clamping each insole to a corresponding last bottom is also provided. A feature of the invention is a treadle-operated mechanism for bringing each gage and clamping mechanism into sequential operation with respect to each insole. Preferably, and as illustrated, the apparatus includes two jacks, two gages and two insole clamping devices with common treadle means for operating the gages and clamping devices in proper sequence for both stations. Another feature of the invention is a locking means for aiding the operator in temporarily holding the shoe parts in assembled relation.

The invention will now be more particularly described by reference to the accompanying drawings and thereafter pointed out in the claims.

In the drawings,

Fig. 1 is a view in front elevation of an apparatus embodying features of the present invention, portions of the structure being omitted or cut away for purposes of clarity;

Fig. 2 is a section on the line II—II of Fig. 1 thereby omitting the heel gage of the left unit but with other portions of that unit added and open to receive the shoe parts;

Fig. 3 is a view somewhat similar to that of Fig. 2 but with more of the frame included and with the heel gage of the left unit in operative position with respect to an insole; and Fig. 4 is a side view of the apparatus as shown in Fig. 1 drawn to a smaller scale and with an insole properly located with respect to a last on the left unit and ready to receive an upper, the right unit being concealed by the left unit.

Figs. 1 and 4 depict the apparatus as being provided with a base plate 10, two jack posts or jacks 12 and 14 (Fig. 1) joined to the base plate 10 by means not shown and preferably braced by inclined straps such as the strap 16 shown in Fig. 4.

As the right and left units of the apparatus are essentially alike except for being of the opposite hand, the description of the units will be limited hereinafter to the left unit and certain parts which are common to both units.

As stated above, the left unit includes the vertical jack 12 upon the top of which is mounted a last retaining means such as a U-shaped member 18 to be received in a recess 20 (Fig. 2) of a shoe last 22. Upon an intermediate portion of the jack 12 a bracket 24 is mounted by means of screws 26 to support a shelf 27 of sufficient size to retain upon it a stack of inverted shoe uppers such as the upper 229 (Fig. 4) placed over and upon the jack 12. A shelf 28 is similarly located on the jack 14.

Beneath the shelves 27 and 28 and attached to the jacks by screws 29 is a horizontal member 30 which is part of a framework (only partially shown) for supporting two platforms 32, 34 (Fig. 1). Each of these platforms is of sufficient size to support a stack of insoles conveniently within reach of the operator. The horizontal member 30 is provided with two flanges 36 and 38 (Fig. 1) for a purpose to be described.

Near the bases of the two jacks 12 and 14 are located two bosses 40 and 42 (Fig. 1) which serve as journals for a shaft 44 to which is attached a hub 46 which is integral with the intermediate portion of a treadle 50. Two collars 52 and 54 are attached to the shaft 44 to maintain the latter in proper position between the two jacks.

Just forward of the shaft 44, or to the right thereof, as shown in Fig. 4, a pivot pin 58 is mounted in fixed relation on the treadle 50 and serves as a pivot for a locking device 60 which is formed somewhat in the shape of a U. A short leg 62 of the locking device is adapted to engage within a member 64 (Figs. 1 and 4) attached to the base plate 10. A coil spring 66 is mounted to extend from a pin 68 in the treadle 50 to a pin 70 in the device 60 and serves to hold the latter in locked position as in Fig. 4.

Intermediate or between the ends of the jacks 12 and 14 are located brackets 72 and 74 which extend rearwardly and serve as journals for a shaft 76 properly held in endwise position by two collars 78 and 80 (Fig. 1).

Extending upwardly between the two shelves 27 and 28 are placed two strap members 82 and 84 which are joined together by means of a semicircular portion 86. The bottom end of the strap member 82 is provided with a hub 88 (Fig. 1) which is mounted on and rigidly pinned to the shaft 76. Extending forwardly from the hub 88 and integral therewith is an arm 90 to the end of which is attached one end of a coil spring 92. The spring 92 is mounted in tension between the arm 90 and a pin 94 affixed to the horizontal frame member 30. Also pinned to the shaft 76 is a hub 96 which is integral with the strap member 84 and which carries a forwardly extending arm 98. A screw 100 is carried in the end of the arm 98 and the end of the screw is adapted to engage the flange 38 (Fig. 1) to form an adjustable stop as will further appear.

The vertical strap member 82 has threaded therein two bolts 85 and 87 (Fig. 4) by means of which a bracket 102 is adjustably held in position. The bracket 102 bears a slot 104 through which the bolts 85 and 87 pass. Integral with the upper end of the bracket 102 is a cylinder 106 the sides of which are slotted to receive the ends of a pin 108 (Figs. 3 and 4). This pin 108 is rigidly affixed to a shaft 110 which is slidable in the cylinder 106 and one end of the shaft 110 bears a block 112 which is grooved at 114 slidably to receive a V-shaped gage 116. The block 112 and gage 116 are held within a definite range of relative movement (along the groove 114) by means of a set screw 118 and a plate 120 coacting with a pin 122 (Fig. 3) which is integral with the gage 116. Interposed between one end of the cylinder 106 and the block 112 is a compressed coil spring 124 through which the rod 110 may slide.

The upper end of the strap member 84 is similarly provided with a V-gage 130.

Centrally located and journaled on the shaft 76 is a hub 132 (Fig. 1) which is integral with the lower ends of two strap members 134 and 136 as well as with a rearwardly extending arm 138 and a forwardly extending arm 140. The outer end of the arm 140 is fitted with a stop screw 142 the end of which is adapted to contact the flange 36 as will further appear. The rearward end of the arm 138 is bifurcated to receive a pivoted block 144 and a two-piece round rod 148 is arranged with its lower portion adapted to slide within the block 144. The two pieces of the rod 148 are pivotally connected by means of a pin and clevis arrangement 149. The lower end of the rod 148 is threadedly connected to an elongated member 150 (Figs. 1 and 4) which in turn is pivoted at 151 to the rearward and bifurcated end of the treadle 50. Three collars 152, 154 and 156 are attached to the rod 148 in the positions shown in Fig. 2. Slidable on the rod 148 and in abutting relation to the block 144 is an annular member 160 against which the upper end of a coil spring 162 is arranged to bear. The lower end of the spring 162 is held on the rod 148 by means of two lock nuts 164 and 166 (Fig. 4) as a means of adjustment for compression of the spring. In abutting relation to the collar 152 is the lower end of a coil spring 170 and the upper end of the spring is in contact with a pivoted block 172 through which the rod 148 is free to slide. The block 172 is pivoted to an L-shaped bracket 174 and is located within the bifurcated and rearwardly extending arm thereof. An upper arm of the bracket 174 is provided with an upwardly extending pin 176 (Figs. 1 and 2) which serves as a pivot for an elongated plate 178 which is adapted to rest upon the top of the bracket 174. Both ends of the plate 178 are bifurcated loosely to receive the curved arm portions 180 and 182 of two holddown mechanisms. In front of the bracket 174 is located a plate 184 which is held in position on the bracket by a pin 186 extending from the bracket through a slot 188 (Fig. 1) in the plate as well as by a screw 190 which passes through the upper end portion of the plate 184 and is threaded into the upper portion of the bracket 174. A spring 192 is placed on the screw 190 and is interposed between the upper end of the plate 184 and a washer 194 abutting the head of the screw 190. The upper end of the plate 184 rests in yielding relation (due to the spring 192) with the side of the plate 178.

The curved arms 180 and 182 are provided with hubs 200 and 202 respectively and these hubs, together with the bracket 174 are journaled on a shaft 204 which joins the two strap members 134 and 136. The arms 180 and 182 are curved downwardly and are provided with members 208 and 210 pivoted to the ends thereof respectively.

The vertical strap members 134 and 136 are held in spaced relation by means of a block 212 and a pin 214 is provided passing through the block to serve as a pivot for a rearwardly extending arm 216. The block 212 is recessed at 218 (Fig. 1) to receive the forward end of the arm 216 and the arm 216 is bored at 220 permitting free passage therethrough of the vertical rod 148. The lower side of the arm 216 is provided with a step 222 which is adapted to coact with the portion 86 as will further appear.

Prior to using the apparatus, an operator would have a supply of lasts, both rights and lefts, beside him. A supply of insoles will be placed on each platform 32, 34, rights on the platform 34 and lefts on the platform 32. The appropriate uppers would then be placed or stacked in inverted position over the jacks 12 and 14 so that each stack or nest of uppers rests upon a shelf 27 or 28. A single upper 229 is shown in position on the shelf 27 in Fig. 4.

In the use of the apparatus, the holddown and gage mechanisms are initially in the open positions as illustrated in Fig. 2, that is, with the heel gages 116 and 130 moved rearwardly and the clamping means or holddown mechanisms raised thereby leaving open the zones immediately surrounding the lasts on the jacks. The operator then places a last 250 for the right foot and in inverted position on the jack 14 and a last 22 for the left foot on the jack 12. At this time the forward end of the treadle 50 is in its uppermost position with the locking device 60 unlatched from the member 64. The operator then takes one insole from the platform 32 with his left hand and another insole from the platform 34 with his right hand and, without difficulty, accurately places them in register with the bottoms of the lasts 22 and 250 although slightly to the rear of the lasts as indicated in Fig. 2. He then steps on the treadle 50 with the result that the rod 148 is pushed upwardly and the compression of the spring 162 is increased to such an extent as to swing the arm 138 upwardly about the shaft 76. Vertical members 134 and 136 will accordingly be swung forwardly about the shaft 76 and the arm 216 will swing the members 82 and 84 forwardly through the action of the step 222 on the portion 86. This will result in the heel gages 116 and 130 abutting the lasts and accurately locating the insoles with respect to the lasts as illustrated in Fig. 3. The heel gages 116 and 130 resiliently engage the heel ends of the lasts and insoles by virtue of the compression springs (such as spring 124) permitting the supporting rods (such as rod 110) to slide rearwardly with respect to their supporting structure. The heel gage 116 may also slide laterally to accommodate itself to the last 22 and to correct any inaccuracy in lateral placement of the heel of the insole by the operator. Lateral movement is permitted by the groove 114 and the pin 122. Gage 130 is similarly mounted for lateral as well as longitudinal movement with respect to the corresponding last.

With the above mode of operation, the heel gages actually move or perform work upon the insoles but the apparatus permits another mode of operation during this preliminary step. The operator may first step on the treadle causing the heel gages to abut the lasts. He may then place the heel ends of the insoles against the gages and the insoles are quickly and properly registered with the bottoms of the lasts.

A continued down motion imparted by the operator to the forward end of the treadle 50 causes an increased compression of the spring 162 with the result that the vertical members 134 and 136 swing farther forwardly into the position as depicted in Fig. 4 and the clamping means or holddown mechanisms (arms 180 and 182 with their members 208 and 210) contact the intermediate portions of the insoles and press them downwardly upon their appropriate lasts and hold them in their proper positions. Simultaneously with this latter action the collar 154 will contact the lower side of the arm 216 and cause the step 222 to become unlatched or detached from the portion 86. This results in releasing the spring 92 which acts through the arm 90 and the vertical members 82 and 84 to swing the heel gages 116 and 130 back into their positions as shown in Fig. 2—i.e.—until the stop screw 100 contacts the flange 38. The insoles remain clamped or held in their proper positions on the lasts.

The operator must then pull upwardly an upper from each of the stacks or nests on the jacks 12 and 14 and temporarily attach the inside margins of the insoles by means of an adhesive and by the use of finger pressure to the insoles on the lasts. The adhesive may be applied either to the outside margins of the insoles or to the inside margins of the uppers and preferably to the former prior to the use of the present apparatus. In order to ensure sufficient time and convenience for the operator to perform his task of attaching the uppers to the insoles he may lock the clamping devices in their operative positions by depressing the forward end of the treadle 50 further until the spring 66 is effective to latch the leg 62 within the member 64.

When the two shoes have been adequately treated in the apparatus, i. e., the uppers properly attached to the insoles—the operator then steps on the treadle 60 to release the treadle 50 and the action of the spring 162 then causes the rod 148 to lower, placing the holddown or clamping mechanisms again in the open positions as depicted in Fig. 2 ready to receive the next pair of shoes. The step 222 again falls behind the portion 86 and the apparatus is ready for the next pair of shoes.

Resiliency in the curved arms 180 and 182 is not solely relied upon to overcome any difference in height in the two insoles or lasts considered for, if such a difference exists, the plate 178 will swivel about the pin 176 and pressure is equally distributed between the two holddown mechanisms regardless of their relative heightwise positions to accommodate lasts of different heights and/or insoles of different thicknesses. The plate 184 acts against the swivel plate 178 by the action of the spring 192 thereby preventing too free turning of the plate 178 and holding the clamping means in positions to be applied to or to act upon the next shoes.

With the use of the apparatus disclosed, an operator need not possess skill and yet he is enabled easily to attach the insoles to the shoe uppers at a high productive rate and with accuracy and uniformity in treatment necessary for quality work.

Having thus described our invention, what we claim as new and desire to secure by Letters Patent of the United States is:

1. Apparatus for use in making shoes including a jack for supporting a shoe last in inverted position, a movably mounted arm for holding an insole in position on the bottom face of said last, a gage movably mounted with respect to the heel end of said last, and treadle means operatively linked to said gage and arm for first bringing said gage into contact with the heel ends of said last and insole then operating said arm to hold the insole against the bottom face of said last and releasing said gage.

2. Apparatus for making shoes including two jacks for supporting two shoe lasts in inverted positions, two gages mounted for movements into and away from abutting relation with the heel ends of said lasts and insoles placed on the latter, means for clamping said insoles to said lasts, and a common treadle operated mechanism for bringing the gages and clamping means into sequential operation.

3. Apparatus for making shoes including a jack supporting a shoe last in inverted position, a gage mounted for movement into and away from abutting relation with the heel ends of said last and an insole placed on the latter, a means for clamping said insole to said last, and a treadle operated mechanism operatively connected to said gage and clamping means for bringing the gage and clamping means into sequential operation and releasing said gage.

4. Apparatus for making shoes including two jacks on which shoe lasts may be mounted in an inverted position, a gage associated with each jack which is mounted for movement into and away from abutting relation with the heel end of each last and an insole placed thereon, a movable arm associated with each jack for holding the insole down on its associated last, treadle means operatively linked to said gages and arms for first bringing said gages into contact with said heel ends and insoles then pressing said arms down upon said insoles and releasing said gages.

5. Apparatus for making shoes including two jacks on which shoe lasts may be mounted in inverted positions, two gages mounted for movement into and away from abutting relation with the heel end of each last and an insole placed thereon, a movable arm associated with each jack for clamping each insole to its associated last, and a common treadle for bringing the gages and clamping arms into sequential operation with respect to each last and thereafter releasing the said two gages.

6. Apparatus for making shoes including a jack, on which a shoe last may be mounted, a gage resiliently mounted for movement into and away from abutting relation with the heel ends of said last and an insole placed thereon, a yielding means for clamping said insole to said last, and a treadle operated mechanism for bringing the gage and clamping means into sequential operation.

7. Apparatus for making shoes including a jack for supporting a shoe last, a gage resiliently mounted for movement into and away from abutting relation with the heel ends of said last and an insole placed thereon, a yielding means for clamping said insole to said last, treadle operated mechanism for bringing the gage and clamping means into sequential operation, and a locking means for holding the clamping means in operative position.

8. Apparatus for making shoes including two jacks upon which two lasts may be mounted in inverted positions, two gages resiliently mounted for movement into and away from abutting relation with the heel ends of each of said lasts and an insole placed thereon, yielding means for clamping an insole on each of said lasts, common treadle operated mechanism for first bringing the gages into operation and then the clamping means, and a locking means for holding the clamping means in operative positions.

9. Apparatus for making shoes including two jacks on each of which a shoe last may be mounted in inverted position, two gages resiliently mounted for movement into and away from abutting relation with the heel ends of each last and an insole placed thereon, yielding means for clamping said insoles to said lasts including a swiveled mounting to equalize the clamping pressure, and a common treadle operated mechanism for bringing the gages and clamping means into sequential operation.

References Cited in the file of this patent

UNITED STATES PATENTS

| | | |
|---|---|---|
| 234,167 | Brock et al. | Nov. 9, 1880 |
| 267,076 | Hall | Nov. 7, 1882 |
| 426,752 | Avery | Apr. 29, 1890 |
| 1,312,509 | Ashton | Aug. 12, 1919 |
| 1,672,139 | Stewart | June 5, 1928 |
| 2,262,805 | Jorgensen | Nov. 18, 1941 |
| 2,609,552 | Kestell | Sept. 9, 1952 |